US012748489B2

(12) United States Patent
Smout

(10) Patent No.: US 12,748,489 B2
(45) Date of Patent: Sep. 29, 2026

(54) HEAD MOUNTED DISPLAY FOR USE IN A VIRTUAL REALITY, MIXED REALITY, OR AUGMENTED REALITY SYSTEM, AND ASSOCIATED SYSTEM

(71) Applicant: CANON KABUSHIKI KAISHA, Tokyo (JP)

(72) Inventor: Andrew M. C. Smout, Edinburgh (GB)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 18/604,699

(22) Filed: Mar. 14, 2024

(65) Prior Publication Data

US 2025/0291410 A1 Sep. 18, 2025

(51) Int. Cl.
*G06F 3/01* (2006.01)

(52) U.S. Cl.
CPC .................................... *G06F 3/013* (2013.01)

(58) Field of Classification Search
CPC ...................................................... G06F 3/013
See application file for complete search history.

(56) References Cited

U.S. PATENT DOCUMENTS 10,078,922 B2 9/2018 Patel
10,241,569 B2 3/2019 Lanman et al.
2018/0081178 A1* 3/2018 Shpunt ................. H04N 13/383
2018/0136720 A1 5/2018 Spitzer et al.
2019/0206315 A1 7/2019 Park et al.
2019/0238827 A1 8/2019 Cambridge
2019/0302883 A1 10/2019 Greer et al.
2021/0165213 A1* 6/2021 Balachandreswaran .................... G02B 27/0172
2021/0173474 A1 6/2021 Sztuk et al.

OTHER PUBLICATIONS

Lee et al., "White LED Backlight Control for Motion Blur Reduction and Power Minimization in Large LCD TVs," Jan. 2009, Journal of the Society for Information Display 25(1):33 https://coldflux.usc.edu/%7Emassoud/Papers/white-LED-backlight-control-jsid.pdf.
Baek, J., "Computational Photography" CS 478 Lecture, Mar. 7, 2012, https://graphics.stanford.edu/courses/cs478/lectures/03072012_image_stabilization.pdf, p. 15.

* cited by examiner

*Primary Examiner* — Shivang I Patel
(74) *Attorney, Agent, or Firm* — Oblon, McClelland, Maier & Neustadt, L.L.P.

(57) ABSTRACT

A head mounted display for use in a virtual reality, mixed reality or augmented reality system comprises a display device configured to display an image, a tracking system configured to determine a gaze direction of a user's eye and an optical system configured to project the image into the user's eye, the optical system comprising an adjustable optical device; and processing circuitry configured to control the adjustable optical device based on the gaze direction of the user's eye such that a position of the image projected into the user's eye is unchanged, when the gaze direction of the user's eye changes.

20 Claims, 9 Drawing Sheets

HEAD MOUNTED DISPLAY FOR USE IN A VIRTUAL REALITY, MIXED REALITY, OR AUGMENTED REALITY SYSTEM, AND ASSOCIATED SYSTEM

FIELD

The present invention relates to a head mounted display for use in a virtual reality, mixed reality or augmented reality system. The invention also relates to a system, for example a telepresence system, a virtual reality system, a mixed reality system and/or an augmented reality system.

BACKGROUND

Head mounted displays, such as virtual reality headsets, find applicability in a range of technological fields, including medical imaging procedures or other medical applications. A head mounted display may include a display device and one or more optical devices configured to project an image on the display device onto the retinas of the user's eyes. For stereoscopic imaging applications, two display panels with slightly different images presented to each eye of the user may be used.

However, the size and/or resolution of the display device may be limited, which may have an impact on the image fidelity and/or the user's experience. It may be desirable to use one or more high-resolution display devices. However, the head mounted display may have a limited computing power and/or bandwidth, which may be insufficient to update the high-resolution display devices at a sufficiently high framerate.

DESCRIPTION

Embodiments are now described by way of non-limiting example with reference to the accompanying drawings in which.

Certain embodiments provide a head mounted display for use in a virtual reality, mixed reality or augmented reality system comprising a display device configured to display an image, a tracking system configured to determine a gaze direction of a user's eye and an optical system configured to project the image into the user's eye, the optical system comprising an adjustable optical device, and processing circuitry configured to control the adjustable optical device based on the gaze direction of the user's eye such that a position of the image projected into the user's eye is unchanged, when the gaze direction of the user's eye changes.

Certain embodiments provide a head mounted display for use in a virtual reality, mixed reality or augmented reality system comprising a display device configured to display an image such that a first region of the image has a higher resolution than a second region of the image, a tracking system configured to determine a gaze direction of a user's eye, an optical system configured to project the first region of the image on a central part of a retina of the user's eye, the optical system comprising an adjustable optical device, and processing circuitry configured to control the adjustable optical device based on the gaze direction of the user's eye such that a position of the first region of the image projected on the retina of the user's eye is unchanged, when the gaze direction of the user's eye changes.

Certain embodiments provide a system comprising a head mounted display according to one or more embodiments described herein, at least one camera positioned remotely relative to the head mounted display and a control system configured to control a position and/or movement of the at least one camera based on the gaze direction.

Figure 1:
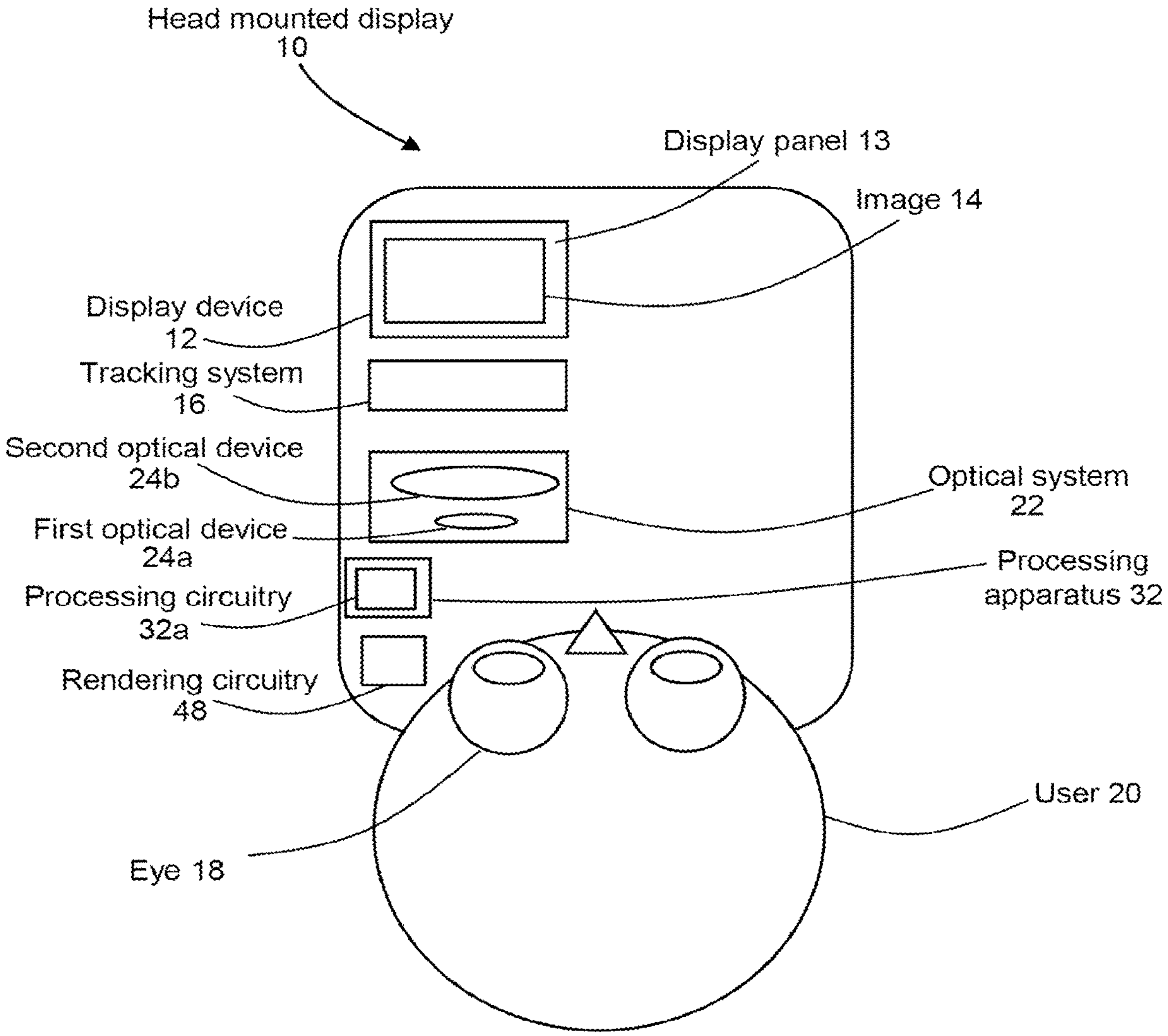
FIG. 1 is a schematic illustration of a head mounted display according to an embodiment.

A head mounted display 10 according to an embodiment is illustrated schematically in FIG. 1. In the present embodiment, the head mounted display 10 comprises a display device 12. The display device 12 may comprise an LCD display, an LED display or the like. The display device 12 is configured to display an image 14. In this embodiment, the display device 12 comprises a display panel 13. The image 14 is displayed on the display panel 13. The image 14 may be an image of a two-dimensional or three-dimensional scene.

The head mounted display 10 comprises a tracking system 16. The tracking system 16 is configured to determine a gaze direction of an eye 18 of a user 20.

The head mounted display 10 comprises an optical system 22. As will be described below in more detail, the optical system 22 is configured to project the image 14 into the eye 18 of the user 20.

Figure 2:
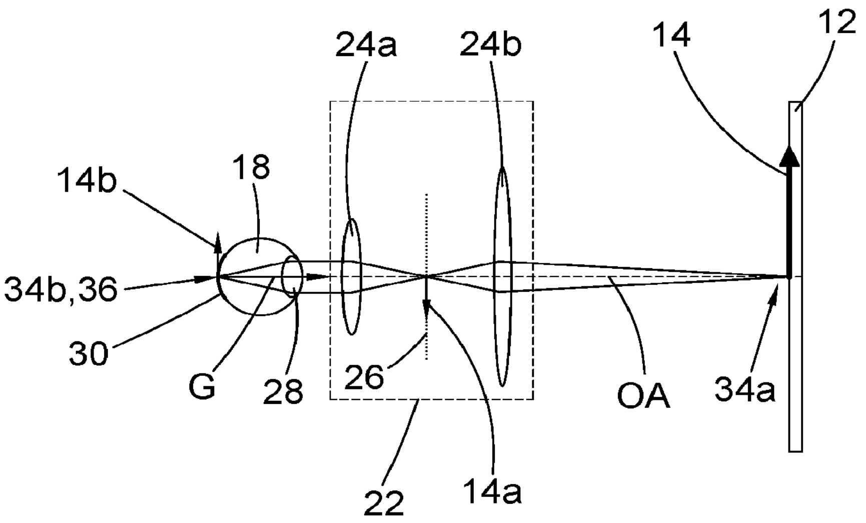
FIG. 2 is a schematic illustration of a part of the head mounted display of FIG. 1.

FIG. 2 illustrates schematically a part of the head mounted display 10. The tracking system and the display panel has been omitted from FIG. 2 for sake of clarity. In the embodiment shown in FIG. 2, the eye 18 of the user 20 looks at a centre of the display device 12. A gaze direction G of the eye 18 of the user 20 is along an optical axis OA of the optical system 22.

In the embodiments shown in FIGS. 1 and 2, the optical system 22 comprise a first optical device 24*a*, which may be implemented as a lens. The first optical device 24*a* may also be referred to as an adjustable focussing component. The optical system 22 comprises a second optical device 24*b*. The second optical device 24*b* is implemented as an adjustable optical device. For example, the second optical device 24*b* may comprise a floating lens or moveable lens. The second optical device 24*b* may also be referred to as an adjustable imaging component. Although FIG. 2 shows the second optical device 24*b* as a single optical element, e.g. a single floating or moveable lens, it will be appreciated that in other embodiments, the second optical device may comprise more than one optical element, e.g. to define a composite lens system.

The first and second optical devices 24*a*, 24*b* may be arranged perpendicularly, e.g. substantially perpendicularly, to the optical axis OA. The first and second optical devices 24*a*, 24*b* may be arranged such that there is an intermediate plane 26 comprising an intermediate image 14*a* between the first and second optical devices 24*a*, 24*b*. The first optical device 24*a* may be configured to image the intermediate image 14*a* to infinity so that the cornea and lens of the eye 18 of the user 20 can project the intermediate image 14*a* onto the retina 30. The cornea and lens of the eye 18 of the user 20 are indicated in FIG. 2 as a single part of the eye 18 of the user 20, using reference numeral 28. The image projected by the optical system 22 and eye 18 of user 20 is indicated in FIG. 2 by reference numeral 14*b*. It will be appreciated that in other embodiments, the first and second optical elements may be differently implemented and/or differently positioned.

Figure 3:
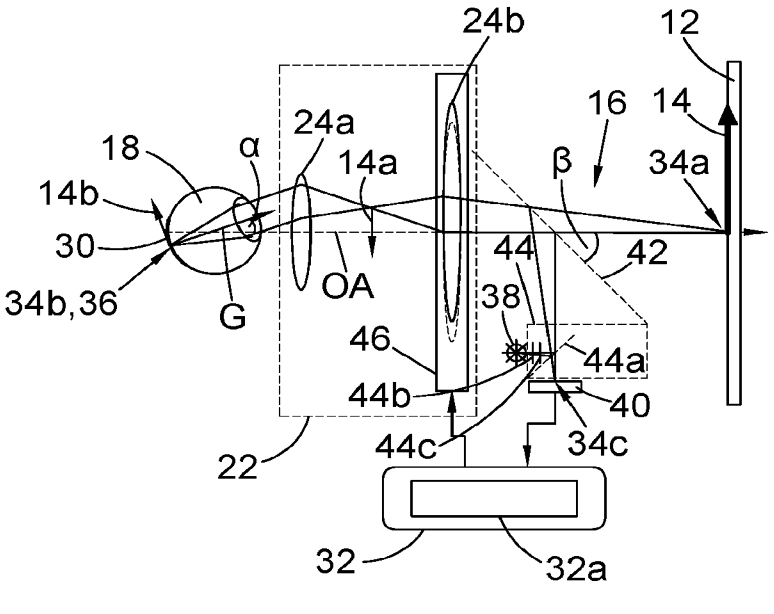
FIG. 3 is a schematic illustration the part of the head mounted display of FIG. 2, including a tracking system and with a different gaze direction of the eye of the user.

FIG. 3 illustrates schematically the part of the head mounted display 10 shown in FIG. 2 with a different gaze direction G of the eye 18 of the user 20. For example, the gaze direction may be at an angle α relative to the optical axis OA. In the embodiment shown in FIG. 3, the user 20 may be considered as looking up. However, it will be appreciated that in other embodiments, the user may look in a different direction, such as down, to the left, to the right or a combination of down, up, left and/or right.

Referring to FIGS. 1 and 3, the head mounted display 10 comprises a processing apparatus 32. The processing apparatus 32 comprises processing circuitry 32*a*. The processing circuitry 32*a* may comprise image processing circuitry. The processing apparatus 32 may comprise a Central Processing Unit (CPU) and Graphical Processing Unit (GPU). The processing circuitry 32*a* may be implemented in the CPU, in the GPU, or in a combination of the CPU and the GPU.

In the present embodiment, the processing circuitry 32*a* is implemented in the CPU and/or GPU of the processing apparatus 32 by means of a computer program having computer-readable instructions that are executable to perform one or more operations of the processing apparatus 32. However, in other embodiments the processing circuitry may be implemented in software, hardware or any suitable combination of hardware and software. In some embodiments, the various circuitries may be implemented as one or more ASICs (application specific integrated circuits) or FPGAs (field programmable gate arrays).

The processing circuitry 32*a* is configured to control the second optical device 24 based on the gaze direction of the eye 18 of the user 20 such that a position of the image projected into the eye 18 of the user 20 is unchanged, when the gaze direction of the eye 18 of the user 20 changes. Expressed differently, the processing circuitry 32*a* may be configured to control the second optical device 24*b* based on the gaze direction G of the eye 18 of the user 20 such that the projected image 14*b* remains stable or immobile in the eye 18 of the user 20, e.g. on the retina 30 of the eye 18 of the user 20. The optical system 22, tracking system 16 and processing apparatus 32 shown in FIGS. 1 to 3 may be referred to as a retinal image stabilisation system.

The optical system 22 comprises first and second conjugate points 34*a*, 34*b*. In FIGS. 2 and 3, the first conjugate point 34*a* is shown at the centre of the display device 12. The first conjugate point 34*a* may be the object point of the optical system 22. The second conjugate point 34*b* is shown at a central part of the retina 30, which may also be referred to as the fovea 36. The second conjugate point 34*b* may be the image point of the optical system 22. The processing circuitry 32*a* is configured to control the second optical device 24 based on the gaze direction G of the eye 18 of the user 20 such that the first conjugate point 34*a* is positioned at the centre of the display device 12 and the second conjugate point 34*b* is positioned at the centre of the retina 30, when the gaze direction G of the eye 18 of the user 20 changes.

In this embodiment, the processing circuitry 32*a* is configured to control a position of the second optical device 24*b* relative to the display device 12. The processing circuitry 32*a* may be configured to control the second optical device 24*b* such that the second optical device 24*b* moves relative to the display device 12, for example in a direction parallel, e.g. substantially parallel, to the display device 12 and/or perpendicular, e.g. substantially perpendicular, to the optical axis OA. In embodiments where the second optical device comprises more than one optical elements, only one of the optical elements may be moved, e.g. to minimise a mass of the moveable optical element.

In the embodiment shown in FIG. 3, the processing circuitry 32*a* is configured to control the second optical device 24*b* such that the second optical device 24*b* moves upwards based on the gaze direction G of the eye 18 of the user 20. In other words, the processing circuitry 32*a* is configured to control the second optical device 24*b* such that the second optical device 24*b* moves from a first position, which is indicated by the dashed outline of the second optical device 24*b* shown in FIG. 3, to a second position, which is indicated by the solid outline of the second optical device 24*b* shown in FIG. 3. When the second optical device 24*b* is in the first position, the projected image 14*b* has moved (not shown in FIGS. 2 and 3) on the retina 30 of the eye 18 of the user 20, because the gaze direction G is not along the optical axis OA. However, when the second optical device 24*b* is in the second position, the projected image 14*b*, is at the same position on the retina 30 of the eye 18 of the user 20, as shown in FIG. 2, although the gaze direction G of the eye 18 of the user 20 is at the angle α relative to the optical axis OA. As can be seen in FIG. 3, the second conjugate point 34*b* of the optical system 22 is at the same position on the retina 30 of the eye 18 of the user 20, e.g. at the fovea 36 of the eye 18 of the user 20, as shown in FIG. 2, when the second optical device 24*b* is in the second position.

The processing circuitry 32*a* is configured to adjust or modulate a brightness of the display device 12. The processing circuitry 32*a* may be configured to increase or reduce the brightness of the display device. In some embodiments, the processing circuitry 32*a* may be configured to reduce the brightness of the display device 12 to zero. For example, when the display device comprises the LCD display, a back illumination of the LCD display may be adjusted or modulated. An exemplary back illumination technique is described in Wonbok Lee et al. "*White-LED backlight control for motion-blur reduction and power minimization in large LCD TVs*," Journal of the Society for Information Display, Volumne 17, Issue 1, January 2009, Pages 37-45. It will be appreciated that in other embodiments, the brightness of the display device may be adjusted or modulated using a different method or technique.

When the display device 12 comprises the LED display, such as the OLED display or other LED display, an output of the LED display may be adjusted or modulated. The display device 12 may comprise a frame rate of about 30 frames per seconds. However, it will be appreciated that the display device disclosed herein is not limited to this exemplary frame rate. For example, in other embodiments may the display device comprise a frame rate of less or more than 30 frames per seconds. The modulation or adjustment of the brightness of the display device 12 may reduce motion blur artefacts, which can include a "scan-and-hold" artefact and/or other artefact, and/or a smearing of the image displayed on the display device and/or improve the user's view comfort.

The tracking system 16 is also shown in FIG. 3. The tracking system 16 may be configured to image a part of the eye 18. In this embodiment, the part to be imaged by the tracking system 16 comprises the retina 30 of the eye 18 of the user 20.

In this embodiment, the tracking system 16 comprises an emitter 38 configured to illuminate the retina 30 of the eye 18 of the user 20. The emitter 38 is configured to emit light, such as near infra-red light. The near infra-red light may have a wavelength of about 820 nm. However, it will be appreciated that in other embodiments, the near infra-red light may have a different wavelength suitable for illuminating the retina of the eye of the user. The emitter 38 may comprise a light emitting diode, laser or other light source. The emitter 38 may also be referred to as an infrared light source.

In this embodiment, the tracking system 16 comprises a sensor 40 configured to capture an image of the retina 30 of the eye 18 of the user 20. The sensor 40 may be implemented as an infrared camera. The sensor 40 may be provided in the form of a charge-coupled device (CCD), complementary metal-oxide-semiconductor (CMOS) imaging sensor or another image sensor. The sensor 40 may be selected to capture images of the retina 30 of the eye 18 of the user 20 at a high speed and with low latency. For example, the sensor 40 may be configured to capture about 1000 image frames per second. The sensor 40 may also be referred to as an infrared light detector or an image sensor.

In this embodiment, the tracking system 16 comprises one or more further optical devices. The one or more further optical devices may be arranged to direct the image of the retina 30 onto the sensor 40. For example, the one or more further optical devices may comprise a reflector 42. The reflector 42 is configured to reflect the light emitted by the emitter 38. For example, the reflector 42 may be configured to only reflect light having the same wavelength or wavelength range, e.g. substantially the same wavelength or wavelength range, as the emitter 38. The reflector 42 may be provided in the form of a dielectric mirror or Bragg mirror. The reflector 42 may also be referred to as a hot mirror.

The reflector 42 is arranged such that the light emitted by the emitter 38 is reflected on the retina 30. The reflector 42 is arranged such that the image of the retina 30 is reflected onto the sensor 40. In the embodiment shown in FIG. 3, the reflector 42 is arranged such that the sensor 40 is positioned in a conjugate plane of the display device 12. For example, a centre or central part of the sensor 40 can define a third conjugate point 34*c*. The centre or central part of the sensor 40 is the third conjugate point to the first and second conjugate points 34*a*, 34*b*. In this embodiment, the reflector 42 is arranged to intersect the optical axis OA of the optical system 22. The reflector 42 is arranged at an angle β relative to the optical axis OA. The angle β may be about 45 degrees.

In some embodiments, the one or more further optical devices may comprise a filter element (not shown in FIG. 3). The filter element may be arranged so that light or radiation reflected by the reflector 42 passes through the filter element before being incident on the camera. A transmission wavelength or transmission wavelength range of the filter element may correspond to the wavelength or wavelength range of the light emitted by the emitter. The configuration of the reflector 42, described above, and/or the filter element may allow for the reflection of light or radiation emitted by the display device 12 onto the sensor 40 to be reduced or avoided. This in turn may result in an effective stabilisation of the projected image 14*b* on the retina 30.

In the embodiment shown in FIG. 3, the one or more further optical devices comprise a third optical device 44 configured to direct the light emitted from the emitter 38 into the optical system 22 so as to illuminate the retina 30. The third optical device 44 may be arranged between the emitter 38 and the sensor 40. The third optical device 44 comprise a beam splitter 44*a*, a diffuser 44*b* and/or a lens 44*c*. The diffuser 44*b* and the lens 44*c* are arranged between the emitter 38 and the beam splitter 44*a* such that the diffuser 44*b* appears to be at infinity from the retina 30. This may avoid an image of the diffuser 44*b* being formed on the sensor 40. As the image of the diffuser 44*b* would not move, when the gaze direction G of the eye 18 of the user 20 changes, an image of the diffuser 44*b* on the camera 40 may reduce a sensitivity of the tracking system 16.

The sensor 40 may be coupled or connected to the processing apparatus 32, e.g. to transmit the image of the retina 30 from the sensor 40 to the processing apparatus 32. Based on the position of the image of the retina 30 on the sensor 40, the processing circuitry 32*a* may be configured to determine an amount of movement to be applied to the second optical device 24*b*. For example, when the gaze direction G of the eye 18 of the user 20 is along the optical axis OA, as shown in FIG. 2, the image of the retina 30 on the sensor 40 may be in a first position. The first position of the image of the retina 30 on the sensor may correspond to the centre or central part of the sensor 40. When the gaze direction G of the eye 18 of the user 20 changes, e.g. as shown in FIG. 3, the image of the retina 30 on the sensor 40 may move to a second position on the sensor 40. The second position of the image of retina 30 on the sensor 40 is indicative of a change in the gaze direction G of the eye 18 of the user 20. Based on the position of the image of the retina 30 on the sensor 40, the processing circuitry 32*a* may be configured to determine the amount of movement to be applied to the second optical device 24*b* to return the image of the retina 30 on the sensor 40 from the second position to the first position. As such, the processing circuitry 32*a* is configured to control the second optical device 24*b* such that the position of the image projected into the eye 18 of the user 20 is unchanged, regardless of the gaze direction G of the eye 18 of the user 20.

In some embodiments, the processing circuitry 32*a* is configured to determine a gaze location of the eye 18 of the user 20 on the display device 12, based on the gaze direction G determined by the tracking system 16. In FIG. 3, the gaze location of the eye of user on the display device 12 corresponds to the central part of the display device 12, e.g. when the second optical device 24b is in the second position. For example, the processing circuitry 32a may be configured to determine or calculate the gaze location based on the amount of movement to be applied to the second optical device 24b.

The processing circuitry 32a may comprise an image stabilization algorithm or model configured to determine the amount of movement to be applied to the second optical device 24b. The image stabilization algorithm or model may be configured to use a cross-correlation to determine the movement of the image of the retina 30 on the sensor 40. In some embodiments, the movement of the image of the retina 30 on the sensor 40, e.g. from the first position to the second position, may be considered as a deviation or error of the position of the image of the retina 30 on the sensor 40. The image stabilization algorithm or model may be configured to determine the amount of movement to be applied to the second optical device 24b so as to reduce the deviation or error of the position of the image of the retina 30 on the sensor 40. As such, the amount of movement to be applied to the second optical device 24b may also be referred to as an amount of corrective movement to be applied to the second optical device 24b. The image stabilization algorithm or model may define a feedback or control loop with the sensor 40.

The processing apparatus 32 is connected to the optical system 22, e.g. to transmit a first signal to the optical system 22. The first signal may be indicative of the amount of movement to be applied to the second optical device 24b. The first signal may also be referred to as a correction signal.

In the embodiment shown in FIG. 3, the optical system 22 comprises an actuator 46. The processing circuitry 32a may be configured to transmit the first signal to the actuator 46. The actuator 46 may be configured to move the second optical device 24b based on the first signal from the processing circuitry 32a. The actuator 46 may comprise an electromagnetic shifting arrangement, which may comprise one or more electromagnets, configured to move the second optical device 24b. It will be appreciated that the optical system 22 may comprise further parts or components configured to limit a range of movement of the second optical device 24b in the direction parallel to the display device 12 and/or perpendicular to the optical axis OA. The further parts or components may comprise one or more bearings, such as one or more magnetic or mechanic bearings.

Figure 4:
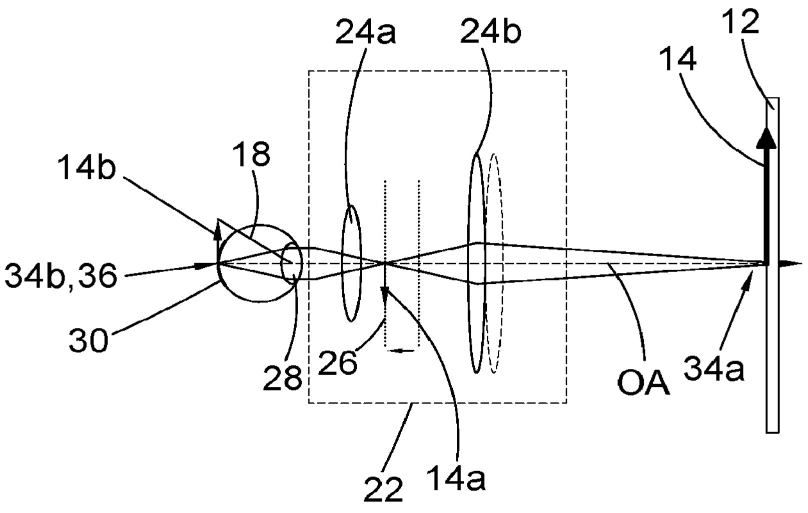
FIG. 4 is a schematic illustration of the part of the head mounted display of FIG. 2, with a different focus of the eye of the user.

FIG. 4 illustrates schematically the part of the head mounted display 10 shown in FIG. 2. The tracking system 16 may be configured to determine a degree of focus of the eye 18 of the user 20. For example, the eye 18 of the user 20 may focus on the display device 12, in front of the display device 12 or behind the display device 12. The determined degree of focus may be indicative of a focal point, e.g. in three dimensions, and a distance to the focal point of the eye 18 of the user 20. For example, the tracking system 16 may be configured to determine a degree of focus of the cornea and lens 28 of the eye 18 of the user 20.

In this embodiment, the processing circuitry 32a is configured to control a focus of the image 14b projected into the eye 18 of the user 20 based on the determined degree of focus. This may allow for one or more changes in the degree of focus of the cornea and lens 28 of the eye 18 of the user 20 to be compensated and/or the projected image 14b to be correctly focussed on the retina 30 of the eye 18 of the user 20.

The processing circuitry 32a is configured to control the second optical device 24b based on the determined degree of focus. For example, the processing circuitry 32 is configured to control the second optical device 24b such that the second optical device 24b is moved in a direction parallel, e.g. substantially parallel, to the optical axis OA. By moving the second optical device 24b in the direction parallel to the optical axis OA, the image 14b projected on the retina 30 of the eye 18 of the user 20 may be moved into focus. Expressed differently, a plane of the projected image 14b may be moved such that the plane of the projected image 14b lies on the retina 30 of the eye 18 of the user 20. Movement of the second optical device 24b may also cause movement of the intermediate image plane 26 and as such, the intermediate image 14a, as shown in FIG. 4.

The optical system 22, the tracking system 16 and/or the processing apparatus 32 may define an automatic focus optical system (not shown). The automatic focus optical system may be configured to determine the degree of focus of the eye 18 of the user 20. For example, in some embodiments, the automatic focus optical system may be configured to determine the degree of focus by analysing one or more spatial frequencies present in the image of the retina 30 on the sensor 40. One or more maximum spatial frequencies may be detected in the image of the retina 30 on the sensor 40, e.g. when the projected image 14b is correctly focused by the cornea and lens 28 on the retina 30 of the eye 18 of the user 20. When the projected image 14b on the retina 30 moves out of focus, e.g. due to a change in the degree of focus of the cornea and lens 28 of the eye 18 of the user 20, the image of the retina 30 on the sensor 40 may become blurred and the spatial frequencies in the image of the retina 30 on the sensor 40 may change, e.g. be reduced.

The automatic focus optical system may be configured to determine a direction of movement of the second optical device 24b, e.g. the intermediate image 14a, based on the spatial frequencies in the image of the retina 30 on the sensor 40. For example, the automatic focus optical system may be configured to determine a gradient of a change of the spatial frequencies as a function of movement of the second optical device 24b.

In some embodiments, the automatic focus optical system may be configured to determine a direction of movement of the second optical device 24b, e.g. the intermediate image 14a, based on the image of the retina 30 on the sensor 40. For example, the image of the retina 30 on the sensor 40 may look differently depending on where the eye 18 of the user 20 focusses, e.g. on the display device 12, in front of the display device 12 or behind the display device 12. As such, the automatic focus optical system may be configured to determine the direction of movement of the second optical device 24b based on an appearance of the image of the retina 30 on the sensor 40.

The above-mentioned direction of movement of the second optical device 24b, e.g. the intermediate image 14a, may be understood as a direction towards or away from the eye 18 of the user 20, e.g. parallel to the optical axis OA. The processing circuitry 32a is configured to control the direction of movement of the second optical device 24b based on the determined direction of movement.

In other embodiments, the automatic focus optical system may be configured to adjust a plane of focus based on a convergence of the user's eyes, as will be described below in relation to FIG. 13. In such embodiments, the automatic focus optical system may be configured to determine a direction of movement of the second optical device 24b, e.g. the intermediate image 14a, based on an angle subtended between a first gaze direction of a first eye of the user 20 and a second gaze direction of a second eye of the user 20. This angle may also be referred to as a convergence angle. For example, when the first and second eyes of the user 20 focus on a point in front of the display device 12, the convergence angle may be increased relative to a convergence angle, when the first and second eyes of the user 20 focus on the display device 12 or a point behind the display device 12. As such, when the convergence angle increases, the processing circuitry 32*a* is configured to control a direction of movement of the second optical device 24*b* such that the intermediate image plane 26 is moved in a direction towards the first and second eyes of the user 20. Alternatively, when the convergence angle decreases, the processing circuitry 32 is configured to control the direction of movement of the second optical device 24*b* such that the intermediate image plane 26 is moved in a direction away from the first and second eyes of the user 20.

In yet other embodiments, the automatic focus optical system may be configured to use a phase detection automatic focus system, a dual pixel automatic focus system or another automatic focus system.

In this embodiment, the actuator 46 shown in FIG. 3 is configured to move the second optical device 24*b* in the direction parallel to the optical axis OA. However, it will be appreciated that in other embodiments, the actuator may be differently implemented or another actuator may be configured to move the second optical device. In such other embodiments, the actuator or other actuator may comprise an electric motor, a piezoelectric motor, such as an ultrasonic motor, or the like.

It will be appreciated that in some embodiments, the second optical device 24*b* may only be moved in the direction perpendicular to the optical axis. In such embodiments, the optical system may additionally comprise another optical device, such as at least one other lens, which may be configured to be moved in the direction parallel to the optical axis to focus the projected image on the retina of the eye of the user. The second optical device 24*b* or the other optical device may each be referred to as an adjustable focussing component.

The processing circuitry 32*a* may be configured to determine a further amount of movement to be applied to the second optical device 24*b* or the other optical device based on the determined degree of focus. For example, the processing circuitry 32*a* may comprise an auto-focus algorithm or model configured to determine the further amount of movement to be applied to the second optical device 24*b* or the other optical device based on the determined degree of focus. The first signal may also be indicative of the further amount of movement to be applied to the second optical device 24*b* or the other optical device.

Figure 5:
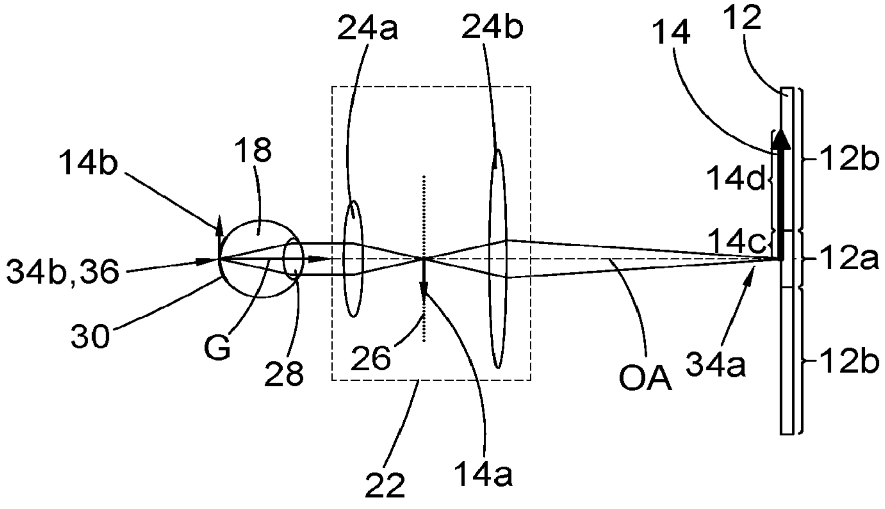
FIG. 5 is a schematic illustration of a part of a head mounted display according to another embodiment.

FIG. 5 illustrates schematically a part of another exemplary head mounted display 10. The part of the head mounted display 10 shown in FIG. 5 is similar to that shown in FIG. 2. Any features described above may also apply to the head mounted display 10 shown in FIG. 5. Only differences will be described in the following.

In this embodiment, the display device 12, including the display panel 13, is implemented as a foveated display. The display device 12 is configured to display an image 14 such that a first region 14*c* of the image 14 has a higher resolution than a second region 14*d* of the image 14. The display device 12 may comprise a first region 12*a* that is configured to display the first region 14*c* of the image 14. The display device 12 may comprise a second region 12*b* that is configured to display the second region 14*d* of the image 14. The first region 12*a* of the display device 12 may also be referred to as a central or foveal region of the display device 12. The second region 12*b* of the display device 12 may also be referred to as a peripheral region of the display device 12.

In some embodiments, the first region 12*a* of the display device 12 comprises a higher density of pixels than the second region 12*b* of the display device 12. For example, the display device 12 may comprise a variable spacing between pixels of the display device. In the first region 12*a* of the display device 12, a spacing between the pixels may be decreased relative to a space of the pixels in the second region 12*b* of the display device 12.

In some embodiments, the head mounted display 10 comprises rendering circuitry 48. The rendering circuitry 48 is configured to render the first region 14*c* of the image 14 using a first resolution and the second region 14*d* of the image 14 using a second resolution, which is lower than the first resolution. This may also be referred to as foveated rendering.

In other embodiments, the display device comprises a first display panel and a second display panel that are composited together using a reflective element. For example, the reflective element may be arranged as part of the first display panel. The reflective element may be arranged in the centre of the first panel. The second display panel may be arranged so that the image displayed by the second display panel is visible on the reflective element. However, it will be appreciated that in other embodiments, the first and second display panels and the reflective element may be differently arranged.

In the embodiment shown in FIG. 5, the gaze direction G of the eye 18 of the user 20 is along the optical axis OA of the optical system 22. The optical system 22 is configured to project the first region 14*c* of the image 14 on the central part, e.g. the fovea 36, of the retina 30 of the eye 18 of the user 20. For example, the optical system 22 is configured such that the centre of the first region 12*a* of the display device 12 and the central part of the retina 30, e.g. the fovea 36, of the eye 18 of user 20 are the first and second conjugate points 34*a*, 34*b* of the optical system 22, as described above. The fovea 36 has greater resolving power than a periphery of the retina 30 and as such, may most benefit from the greater resolution of the first region 14*c* of the image 14.

Figure 6:
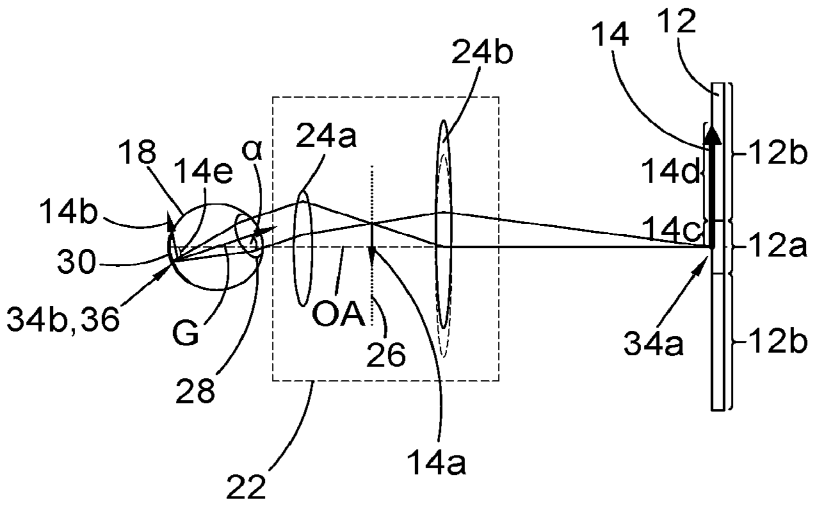
FIG. 6 is a schematic illustration of the part of the head mounted display of FIG. 5 with a different gaze direction of the eye of the user.

FIG. 6 illustrates schematically the part of the head mounted display 10 shown in FIG. 5 with a different gaze direction G of the eye 18 of the user 20. For example, the gaze direction may be at the angle relative a to the optical axis OA. In the embodiment shown in FIG. 6, the user 20 may be considered as looking up. However, it will be appreciated that in other embodiments, the user may look in a different direction, such as down, to the left, to the right or a combination of down, up, left and/or right.

The processing circuitry 32*a* is configured to control the second optical device 24*b* based on the gaze direction G of the eye 18 of the user 20 such that that a position of a first region 14*e* of the image projected on the retina 30 of the eye 18 of the user 20 is unchanged, when the gaze direction G of the eye 18 of the user 20 changes This may allow for alignment of the first region 14*c* of the image 14 with the gaze direction G, e.g. such that a centre of the first region 14*c* of the image 14 and the central part of the retina 30, e.g. the fovea 36, are conjugate points of the optical system 22. As such, a centre of a field of view of the user 20 may be aligned with the first region 12*a* of the display device 12.

By configuring the processing circuitry 32*a* to control the second optical device 24*b* based on the gaze direction G of the eye 18 of the user 20 such that a position of the first region 14*e* of the image 14*b* projected on the retina 30 of the eye 18 of the user 20 is unchanged, when the gaze direction G of the eye 18 of the user 20 changes, the user 20 may experience a display device with a high resolution and high framerate, while allowing for less computing power and/or bandwidth of the head mounted display compared to a head mounted display configured to display the entire image at the higher resolution.

As described above, the processing circuitry 32*a* is configured to control the second optical device 24*b* such that the second optical device 24*b* moves, e.g. moves upwards, based on the gaze direction G of the eye 18 of the user 20. Referring to FIG. 6, when the second optical device 24*b* is in the first position, the projected first region 14*e* of the image 14*b* is not centred on the fovea 36 of the eye 18 of the user 20, because the gaze direction G is at the angle α relative to the optical axis OA. However, by moving the second optical device 24*b* into the second position, the projected first region 14*e* of the image 14*b* returns to the central part of the retina 30, e.g. the fovea 36, although the gaze direction G of the eye 18 of the user 20 is at the angle α relative to the optical axis OA, e.g. as shown in FIG. 6.

Figure 7:
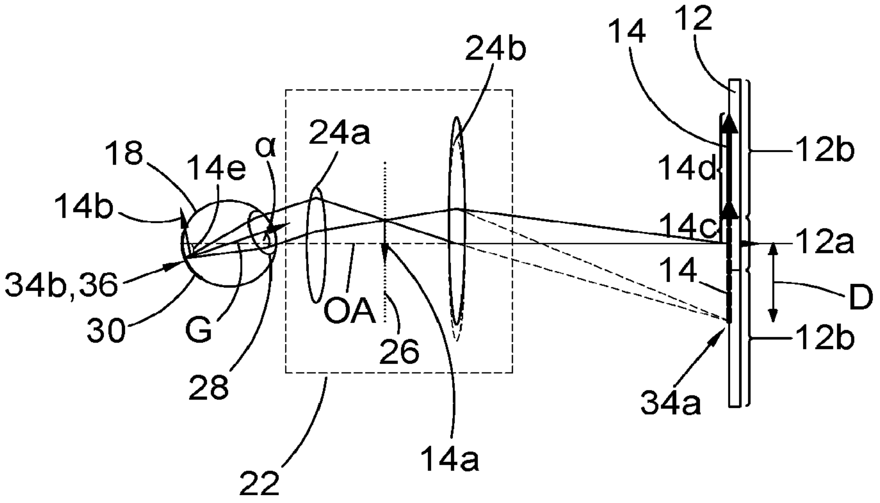
FIG. 7 is another schematic illustration of the part of the head mounted display of FIG. 5 with a different gaze direction of the eye of the user.

FIG. 7 illustrates schematically the part of the head mounted display 10 shown in FIG. 5 with the different gaze direction G of the eye 18 of the user 20. In this embodiment, the user 20 looks at a different part of the image 14 that is displayed by the display device 12. The different part of the image 14 may also be referred to as a part of interest of the image 14. The part of interest of the image 14 is displayed by the second region 12*b* of the display device 12. A position of the part of interest of the image 14 on the display device 12 is indicated in FIG. 7 by the dashed line.

When the second optical device 24*b* is in the first position, which is indicated by the dashed outline of the second optical device 24*b* in FIG. 7, the first conjugate point 34*a* of the optical system 22 is shifted relative to a centre of the first region 12*a* of the display device 12. As described above, the processing circuitry 32*a* is configured to control the second optical device 24*b* such that the second optical device 24*b* moves into the second position, which is indicated by the solid outline of the second optical device 24*b* in FIG. 7. By moving the second optical device 24*b* from the first position to the second position, the first conjugate point 34*b* returns to the centre of the first region 12*a* of the optical device 12. However, the part of interest of the image 14 remains at a first position on the display device 12, as indicated by the dashed line in FIG. 7.

FIG. 7 also illustrates a second position of the part of interest of the image 14 on the display device 12, which is indicated by the solid line. A difference D between the first position and the second position of the part of interest of the image 14 on the display device 12 is indicated in FIG. 7. The difference D between the first and second positions of the image 14 may also be referred to as an amount of pan to be applied.

As described above, the processing circuitry 32*a* is configured to determine the gaze location of the eye 18 of the user 20 on the display device 12 based on the gaze direction G determined by the tracking system 16. In this example, the gaze location is indicated by the first conjugate point 34*a*, which is shifted relative to the centre of the display device 12, when the second optical device 24*b* is in the first position. In other words, the gaze location may be considered as a location on the display device 12 that displays the part of interest of the image 14. As described above, the processing circuitry 32*a* may be configured to determine or calculate the gaze location based on the amount of movement to be applied to the second optical device 24*b*.

As described above, the head mounted display 10 may comprise rendering circuitry 48. The rendering circuitry 48 may be configured to render the image 14 based on the determined gaze location. The rendering circuitry 24 may be configured to change a position of the image 14 on the display device 12. In this embodiment, the rendering circuitry 48 is configured to apply the amount of pan to the image 14 such that the part of interest of the image 14 is moved from the first position to the second position on the display device 12. The rendering circuitry 48 may be configured to determine the amount of pan to be applied to the image 14 based on the determined gaze location. The rendering circuitry 48 may be configured to apply the determined amount of pan to the image 14 such that the part of interest of the image 14 corresponds to the first region 14*c* of the image 14 and/or is displayed by the first region 12*a* of the display device 12. The part of interest of the image 14 may change as the gaze direction G of the eye 18 of the user 20 changes. By configuring the rendering circuitry to render the image 14 based on the determined gaze location, which in turn is determined based on the gaze direction G, such that the part of interest of the image 14 corresponds to the first region 14*c* of the image 14 and/or is displayed by the first region 12*a* of the display device 12, the rendering circuitry 24 may cause an appearance of the user 20 looking at a large display having a high resolution, when the user 20 moves his eyes 18 to explore the image 14.

Figure 8:
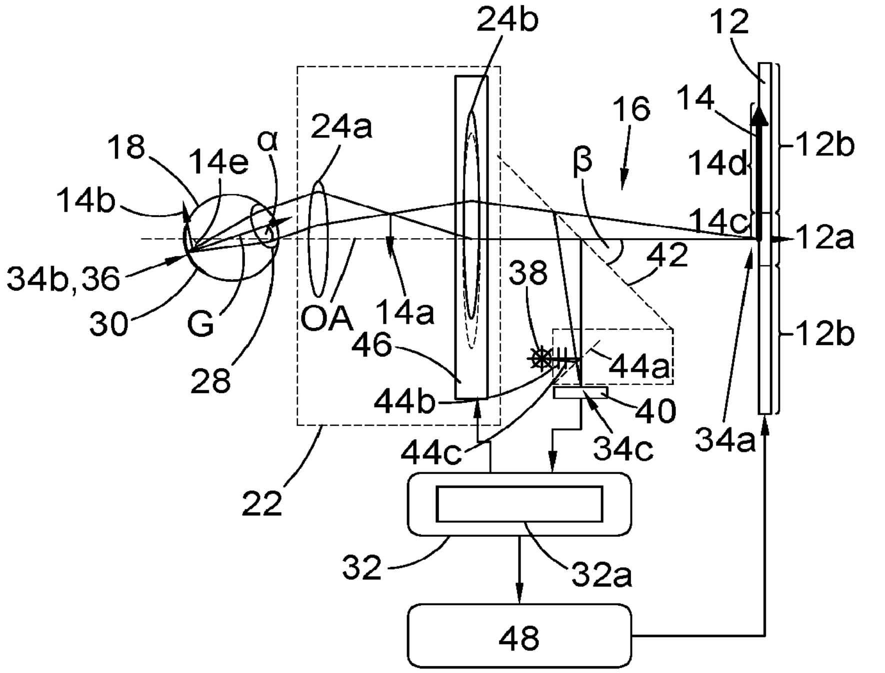
FIG. 8 is another schematic illustration of the part of the head mounted display of FIG. 5, including a tracking system and with a different gaze direction of the eye of the user.

FIG. 8 illustrates schematically the part of the head mounted display 10 shown in FIG. 5 with the different gaze direction G of the eye 18 of the user 20 and the tracking system 16. The part of the head mounted display 10 shown in FIG. 8 is similar to that shown in FIG. 3. Any features described above may also apply to the head mounted display shown in FIG. 8. Only differences will be described in the following.

FIG. 8 also illustrates the rendering circuitry 48. The rendering circuitry 48 may be configured to render the image 14 on the display device 12 based on the determined gaze location, as described above. The processing circuitry 32*a* may be configured to transmit a second signal to the rendering circuitry 48. The second signal may be indicative of the determined gaze location. The rendering circuitry 48 may be configured to determine the amount of pan to be applied to the image 14 based on the second signal. The rendering circuitry 48 may be configured to render the image 14 based on the determined amount of pan to be applied to the image 14, as described above. The rendering circuitry 48 may be configured to transmit a third signal to the display device 12. The third signal may be indicative of the rendered image.

Figure 9:
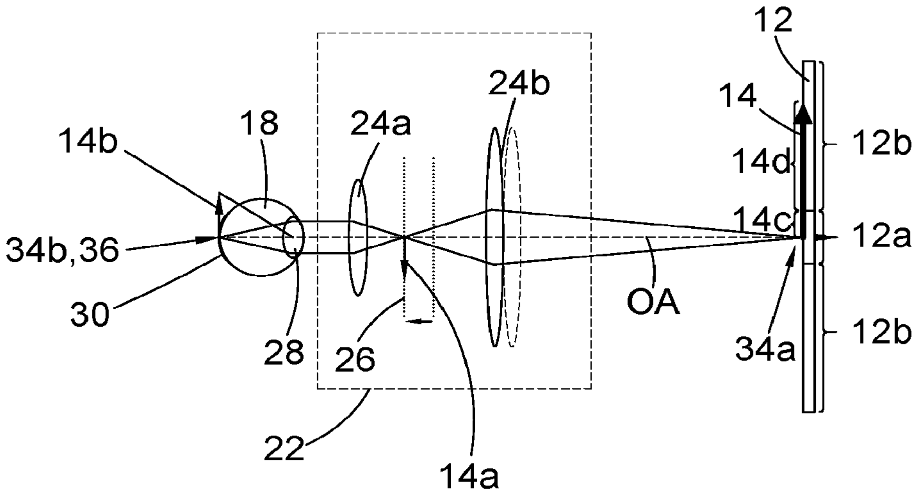
FIG. 9 is a schematic illustration of the part of the head mounted display of FIG. 5, with a different focus of the eye of the user.

FIG. 9 illustrates schematically the part of the head mounted display 10 shown in FIG. 5. The part of the head mounted display 10 shown in FIG. 9 is similar to that shown in FIG. 4. Any features described above may also apply to the head mounted display 10 shown in FIG. 9. Only differences will be described in the following.

In this embodiment, the second signal described above is also indicative of the determined degree of focus of the eye 18 of the user 20. The rendering circuitry 48 is configured to render the image 14 based on the second signal. For example, the rendering circuitry 24 may be configured such that one or more parts of the first region 14*c* of the image 14 that may be projected into the eye 18 of the user 20 in proximity to the focal point of the eye 18 of the user 20 appear sharper than one or more other parts of the first and/or second regions 14*c*, 14*d* of the image 14, which may be distal to the focal point of the eye 18 of the user 20.

FIGS. 1 to 9 shows the head mounted display 10 for a single eye 18 of the user 20. However, it will be appreciated that the head mounted display 10 may comprise the respective parts for another eye of the user 20.

Figure 10:
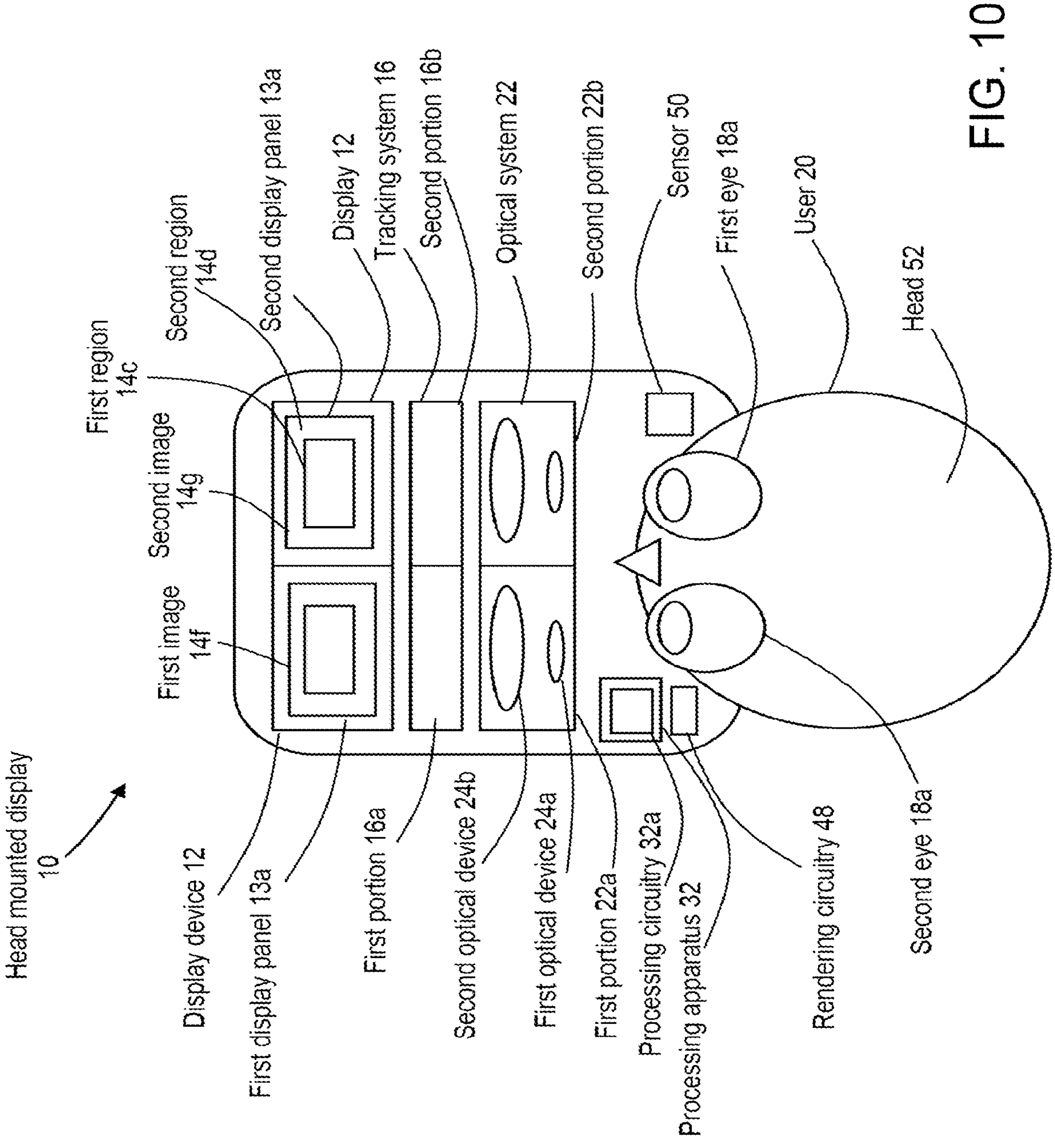
FIG. 10 is a schematic illustration of a head mounted display according to another embodiment.

FIG. 10 schematically illustrates another embodiment of a head mounted display 10. The head mounted display shown in FIG. 10 is similar to that described above in relation to FIG. 1. Any features described above may also apply to the head mounted display shown in FIG. 10. Only differences will be described in the following.

The tracking system 16 may be configured to determine a gaze direction of each eye of the user 20. In this embodiment, the tracking system 16 comprises a first portion 16*a* that is configured to determine a gaze direction G1 of a first eye 18*a* of the user 20. The tracking system 16 comprises a second portion 16*b* that is configured to determine a gaze direction G2 of the second eye 18*b* of the user 20. Each of the first and second portions 16*a*, 16*b* of the tracking system 16 may comprise the emitter 38, sensor 40, reflector 42 and third optical device 44, as described above in relation to FIGS. 3 and 8.

In this embodiment, the display device 12 comprises a first display panel 13*a* configured to display a first image 14*f*. The display device 12 comprises a second display panel 13*b* configured to display a second image 14*g*. The first and second images 14*e*, 14*g* displayed by the first and second display panels 13*a*, 13*b*, respectively, may be different or the same. In this embodiment, the first and second display panels 13*a*, 13*b* are each implemented as a foveated display panels, as described in relation to FIGS. 5 to 9. However, it will be appreciated that in other embodiments, the first and second display panels may each be implemented in the same manner as the display panel 13 of the display device 12 described in relation to FIGS. 1 to 4.

The optical system 22 may comprise a first portion 22*a* and a second portion 22*b*. Each of the first and second portions 22*a*, 22*b* of the optical system 22 may comprise the first optical device 24*a*, the second optical device 24*b* and/or the other optical device, as described above. The first portion 22*a* of the optical system 22 is configured to project the first image 14*f* that is displayed on the first display panel 13*a* into the first eye 18*a* of the user 20. The second portion 22*a* of the optical system 22 is configured to project the second image 14*g* that is displayed on the second display panel 13*b* into the second eye 18*b* of the user 20. The head mounted display 10 shown in FIG. 10 may also be referred to as a stereoscopic head mounted display.

Figure 11:
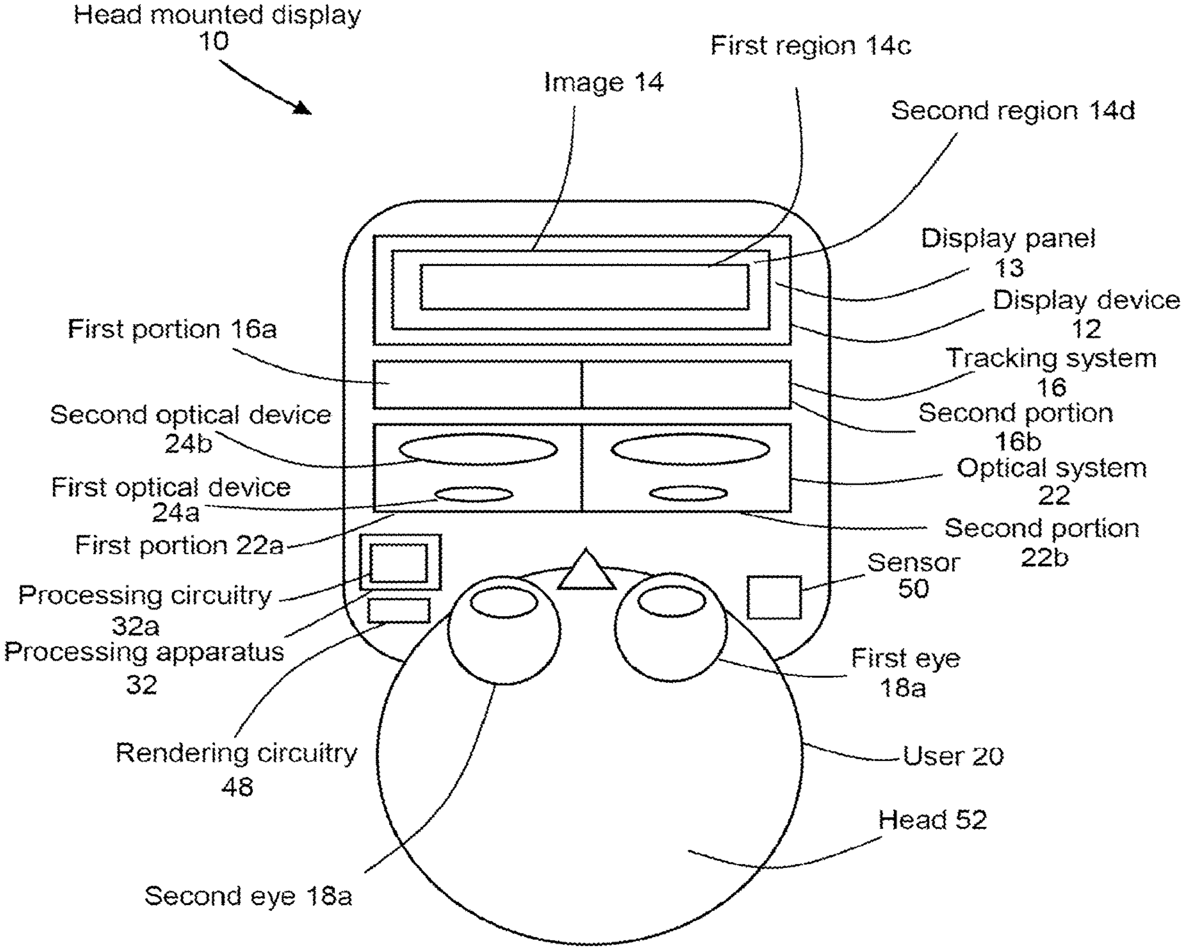
FIG. 11 is a schematic illustration of a head mounted display according to another embodiment.

FIG. 11 schematically illustrates another embodiment of a head mounted display 10. The head mounted display shown in FIG. 11 is similar to that described above in relation to FIG. 10. Any features described above may also apply to the head mounted display shown in FIG. 11. Only differences will be described in the following.

In this embodiment, the display device 12 comprises a single display panel 13. The display device 12, including the display panel 13, is implemented as a foveated display device, as described in relation to FIGS. 5 to 9. However, it will be appreciated that in other embodiments, the display device may each be implemented in the same manner as the display device 12 described in relation to FIGS. 1 to 4.

In this embodiment, the first and second portions 22*a*, 22*b* of the optical system 22 are each configured to project the image 14 that is displayed on the display panel 13 into the first and second eyes 18*a*, 18*b* of the user 20, respectively. The head mounted display 10 shown in FIG. 11 may also be referred to as a binocular head mounted display.

Figure 12:
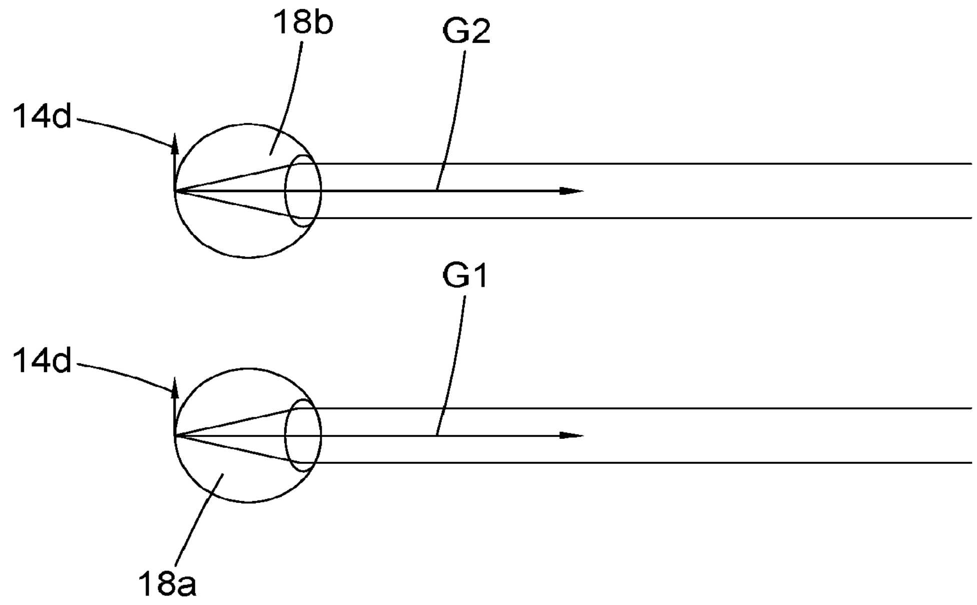
FIG. 12 is a schematic illustration of an example in which both of first and second eyes of the user look in the same direction.

FIG. 12 illustrates an example in which both of the first and second eyes 18*a*, 18*b* of the user 20 look in the same direction. The first and second eyes 18*a*, 18*b* of the user 20 may be considered as looking to a focal point in a faraway distance.

Figure 13:
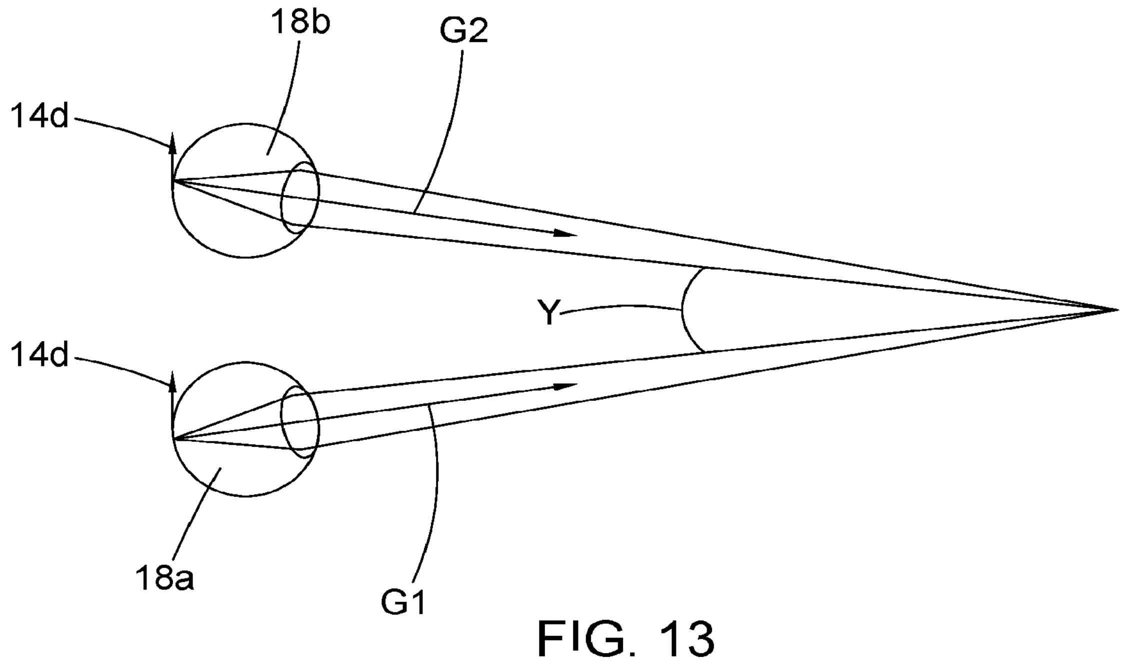
FIG. 13 is a schematic illustration of an example in which the first and second eyes of the user look in different directions.

FIG. 13 illustrates an example in which the first and second eyes 18*a*, 18*b* of the user 20 look in different directions. The tracking system 16 may be configured to determine an angle γ subtended between the first and second eyes 18*a*, 18*b* of the user 20 based on the gaze directions G1, G2 of the first and second eyes 18*a*, 18*b* of the user 20. The angle γ subtended between the first and second eyes 18*a*, 18*b* of the user 20 may be indicative of a convergence of the first and second eyes 18*a*, 18*b* of the user 20. The tracking system 16 may be configured to determine a degree of focus of each of the first and second eyes 18*a*, 18*b* based on the determined angle γ. The optical system 22, e.g. each of the first and second portions 22*a*, 22*b* thereof, is configured to focus the projected first image, the projected second image and/or the projected image based on the determined degree of focus, as described above in relation to FIGS. 4 and 9. This may allow for the first image, 14*f*, the second image 14*g* and/or the image 14 to be correctly focussed into the first and second eyes 18*a*, 18*b* of the user 20 and/or provide a more natural viewing experience for the user 20. For example, the first and second gaze directions G1, G2 of the first and second eyes 18*a*, 18*b* of the user 20 may be different for the binocular head mounted display. This may be because the user 20 may choose to view image 14 on display panel 13 at an apparent position other than infinity, e.g. at a position apparently one meter away. In such an example, the first and second gaze directions G1, G2 converge towards each other, as shown in FIG. 13.

As described above, the processing circuitry 32*a* may be configured to determine a first gaze location of the first eye 18*a* of the user 20 and a second gaze location of the second eye 18*b* of the user 20 on the respective first and second display panels 13*a*, 13*b*, of the head mounted display 10 shown in FIG. 10 or the display panel 13 of the head mounted display 10 shown in FIG. 11, based on the first and second gaze directions G1, G2.

The rendering circuitry 48 may be configured to render the first image 14*f* on of the first display panel 13*a* and/or the second image 14*g* on second display panels 13*a*, 13*b* of the head mounted display 10 shown in FIG. 10 or the image 14 on display panel 13 of the head mounted display 10 shown in FIG. 11 based on the determined degree of focus and/or the first and second gaze locations, as described above. This may allow for the user 20 to be provided with a stereoscopic view or binocular view.

In the embodiments shown in FIGS. 10 and 11, the head mount display 10 comprises a sensor 50 for detecting movement of the head 52 of the user 20, an attitude or position of the head 52 of the user 20, and/or a change of attitude or position of the head 52 of the user 20. For example, the sensor 50 may be implemented as a gyroscopic sensor. It will be appreciated that in other embodiments one or more other sensors, such as one or more accelerometers, may be additionally or alternatively used to the gyroscopic sensor. The sensor 50 may be configured to detect roll, pitch and/or yaw of the head 52 of the user 20.

Figure 14:
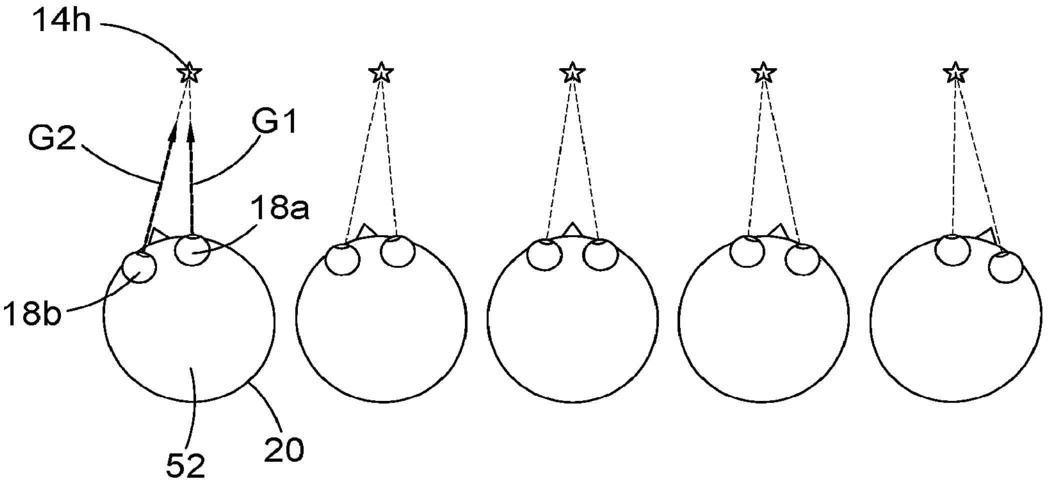
FIG. 14 is a schematic illustration of exemplary movements of a head of the user.

FIG. 14 schematically illustrates exemplary movements of a head 52 of the user 20. When the user 20 is interested in a part 14*h* of the first image 14*f*, the second image 14*g* and/or the image 14 that is not part of the first region 14*c* of the first image 14*f*, the second image 14*g* and/or the image 14, the user 20 may move the first eye 18*a*, second eye 18*b* and/or their head 52. This part 14*h* of the first image 14*f*, the second image 14*g* and/or the image 14 will be referred to in the following as the part of interest 14*h*.

In this embodiment, the processing circuitry 32*a* may be configured to determine the first gaze location of the first eye 18*a* of the user 20 and the second gaze location of the second eye 18*b* of the user 20 on the respective first and second display panels 13*a*, 13*b*, of the head mounted display 10 shown in FIG. 10 or the display panel 13 of the head mounted display 10 shown in FIG. 11, based on the first and second gaze directions G1, G2 and at least one of the detected movement of the head 52 of the user 20, detected attitude or position of the head 52 of the user 20 and detected change of attitude or position of the head 52 of the user 20. The rendering circuitry 48 is configured to render the first image 14*f*, the second image 14*g* and/or the image 14 based on the determined first and second gaze locations, e.g. to provide the user 20 with a stereoscopic view or a binocular view of the part of interest 14*h* of the first image 14*f*, the second image 14*g* and/or the image 14.

In embodiments where the display device 12 and/or the first and second display panels 13*a*, 13*b* are implemented as the foveated display device, the rendering circuitry 48 may be configured to render the first image 14*f*, the second image 14*g* and/or the image 14 based on determined first and gaze locations such that the part 14*h* of interest of the of the first image 14*f*, the second image 14*g* and/or the image 14 is displayed on the first region 12*a* of the display device 12 and/or corresponds to the first region 14*c* of the first image 14*f*, the second image 14*g* and/or the image 14.

By configuring the rendering circuitry 48 to render the first image 14*f*, the second image 14*g* and/or the image 14 based on determined first and second gaze locations, the user 20 may be provided with an immersive and/or more natural viewing experience.

The sensor 50 may be configured to transmit a fourth signal to the rendering circuitry 48. The fourth signal may be indicative of the detected movement of the head 52 of the user 20, the detected position or attitude of the head 52 of the user 20 and/or the detected change of attitude or position of the head 52 of the user 20. The rendering circuitry 48 may be configured to render the first image 14*f*, the second image 14*g* and/or the image 14 based on the fourth signal.

Figure 15:
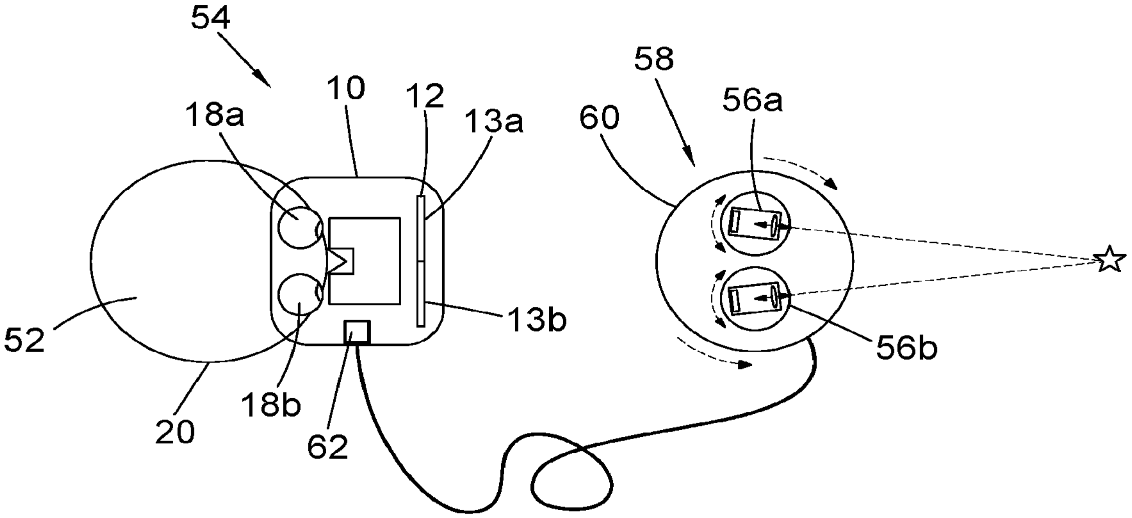
FIG. 15 is a schematic illustration of a system comprising the head mounted display of FIG. 10.

FIG. 15 schematically illustrates a system 54 comprising a head mounted display 10. The head mount display 10 shown in FIG. 15 may comprise any features of the head mount display 10 described above in relation to FIG. 10. In the present embodiment, the system 54 comprises a telepresence system. However, it will be appreciated that in other embodiments, the system may comprise a virtual reality system, a mixed reality system or an augmented reality system.

The system 54 comprises at least one camera, which is positioned remotely relative to the head mount display 10. The camera may be implemented as a foveated camera. For example, the camera may comprise an image sensor having a first region with a first resolution and a second region with a second resolution. The first resolution may be higher than the second resolution. The first region of the image sensor may correspond to a central or foveal region of the image sensor. The second region of the image sensor may correspond to a peripheral region of the image sensor.

In the embodiment shown in FIG. 15, the system 54 comprises a first camera 56*a* and a second camera 56*b*. However, it will be appreciated that in other embodiments, the system may comprise more or less than two cameras.

The first and second cameras 56*a*, 56*b* may be part of an apparatus 58 that is operated remotely from the head mount display 10. The first and second cameras 56*a*, 56*b* may be part of a stereoscopic camera platform 60 of the apparatus 58.

The first camera 56*a* may be associated with the first eye 18*a* of the user 20. The second camera 56*b* may be associated with the second eye 18*b*. The display device 12 may comprise the first display panel 13*a* and the second display panel 13*b*, as described above. The first display panel 13*a* may be configured to display a first image 14*f* captured by the first camera 56*a*. The second display panel 13*b* may be configured to display a second image 14*g* captured by the second camera 56*b*.

The system 54 comprises a control system 62. The control system 62 may be part of the head mounted display 10. The control system 62 may comprise a processing circuitry, which may comprise any of the feature of the processing circuitry 32*a* described above.

The head mount display 10 may be connected to the apparatus 58, e.g. using a wired or wireless connection. This may allow for signals between the head mount display 10 and the apparatus 58 to be transmitted. For example, the apparatus 58 may be configured to transmit a first signal to the head mount display 10. The first signal may be indicative of first and second images 14*f*, 14*g* captured by the first and second cameras 56*a*, 56*b*, respectively. The head mount display 10 may be configured to transmit a second signal to the apparatus 58. The second signal may be indicative of a position or attitude, movement and/or degree of focus of at least one or each of the first and second cameras 56*a*, 56*b*. The second signal may also be indicative of a position, attitude and/or orientation of the apparatus 58, e.g. the stereoscopic camera platform 60.

The control system 62 may be configured to control at least one or each of the first and second cameras 56*a*, 56*b* based on the first and/or second gaze directions G1, G2 of the first and/or second eyes 18*a*, 18*b* of the user 20 and/or the determined degree of focus of at least one or both of the first and second eyes 18*a*, 18*b* of the user 20. For example, the first camera 56*a* may be controlled based on the gaze direction G1 of the first eye 18*a* of the user 20 and/or the determined degree of focus of the first eye 18*a* of the user 20. The second camera 56*b* may be controlled based on the gaze direction G2 of the second eye 18*b* of the user 20 and/or the determined degree of focus of the second eye 18*b* of the user 20. The control system 62 may be configured to control a position or attitude, movement and/or a degree of focus of at least one or both of the first and second cameras 56*a*, 56*b* based on the first and/or second gaze directions G1, G2 of the first and/or second eyes 18*a*, 18*b* of the user 20 and/or the determined amount of focus of at least one or both of the first and second eyes 18*a*, 18*b* of the user 20.

The control system 62 may be configured to control a position, attitude and/or orientation of the apparatus 58, e.g. the stereoscopic camera platform 60, based on the determined movement of the head 52 of the user 20, the determined attitude or position and/or change of attitude or position of the head 52 of the user 20. As such, the position or attitude and/or orientation of the first and/or second cameras 56*a*, 56*b* may also be controlled by the control system 62 based on the determined movement of the head 52 of the user 20, the determined attitude or position and/or change of attitude or position of the head 52 of the user 20.

The system 54 may allow for the apparatus 58 to be used for inspection in hazardous environments, where it may not be safe for the user. Alternatively, the apparatus 58 may be part of a telerobotic apparatus, thereby facilitating telepresence. In yet other embodiments, the apparatus may be part of a robotic medical or surgical apparatus, such as an endoscope or the like, e.g. for exploring a part or organ of a patient or other subject. It will be appreciated that the system 54 is not limited to the applications or uses disclosed herein and may use or application in other apparatuses or systems.

Certain embodiment provide a head mounted display for use in a virtual reality system, the head mounted display comprising an eye tracking system configured to determine a gaze direction of an eye of a user, a foveated display configured to display an image using a first, higher resolution in a central region of the foveated display and a second, lower resolution in a peripheral region of the foveated display and an optical system configured to project an image of said foveated display into the eye of the user; wherein the optical system comprises an adjustable imaging component configured to adjust a direction of projection of the image in dependence on the determined gaze direction.

The adjustable imaging component may comprise a moveable lens.

The eye tracking system may comprise an infrared sensitive camera, a hot mirror configured to place the infrared sensitive camera in a conjugate plane to the foveated display, an infrared light source configured to illuminate a retina of the eye of the user such that an image of the retina is formed on said infrared sensitive camera and image processing circuitry configured to determine movement of the image of the retina.

The head mounted display may further comprise image stabilisation circuitry configured to control the adjustable imaging component such that the image of the retina is kept in a fixed position relative to the infrared sensitive camera.

The head mounted display may further comprise rendering circuitry for rendering a foveated image for display on the foveated display. The rendering circuitry may be configured to render the foveated image from a 3D scene using the determined gaze direction, such that a view presented to the user changes as their gaze direction changes.

The eye tracking system may be further configured to determine a degree of focus of the eye of the user. The optical system may comprise an adjustable focussing component configured to adjust a focus of the projected image in accordance with the determined degree of focus.

The rendering circuitry may be configured to render the foveated image using the determined degree of focus, such that a view presented to the user changes as their degree of focus changes.

Certain embodiments provide a head mounted display comprising a first instance and a second instance of the head mounted display according to one or more embodiments described above. Each of the first and second instances may relate to a respective eye of the user, thereby providing a stereoscopic effect.

The eye tracking system of the first instance may be configured to determine a gaze direction of a first eye of the user. The eye tracking system of the first instance may be configured to determine a gaze direction of a second eye of the user. One or both eye tracking systems may be configured to determine an angle subtended between the first eye and the second eye.

An adjustable focussing component may be configured to adjust a focus of the projected image in accordance with the determined subtended angle.

The rendering circuitry may be configured to render a pair of foveated images such that a stereoscopic view is presented to the user.

The head mounted display may further comprise a head movement tracking system configured to determine movement and/or attitude and/or change of attitude of a head of the user. The head movement tracking system comprises gyroscopic sensors configured to determine yaw, tilt and roll of the head.

The rendering circuitry may be configured to render the foveated image in dependence on the movement and/or attitude and/or change of attitude of a head of the user of the head of the user as determined by the head movement tracking system.

Certain embodiment provide a telepresence and/or mixed reality system comprising the head mounted display according to one or more embodiments described above, a pair of cameras positioned remotely relative to the head mounted display and a control system controlling motion of the pair of cameras in dependence on the gaze direction of the first eye, the gaze direction of the second eye, and the determined movement and/or attitude and/or change of attitude of the head.

The central region of the foveated display may comprise a higher density of display pixels than the peripheral region of the foveated display.

The foveated display may comprise two displays composited together using a mirror.

The image displayed by the foveated display may be rendered using a first, higher rendering resolution in the central region of the foveated display and a second, lower rendering resolution in the peripheral region of the foveated display.

Certain embodiments provide a head mounted display comprising a first optical device, a foveated display, a second optical device, an eye tracking device, and processing circuitry configured to control the second optical device by shifting based on movement of user's eye tracked by the eye tracking device.

The second optical device may be adjusted to image an image on the user's retina. The image may be rendered on a center of the foveated display.

The foveated display may have a first region, which has a first resolution and a second region, which surrounds the first region. The second region may have a second resolution, which is less than the first resolution.

The head mounted display may further comprise an infrared light source, which emits infrared light, a hot mirror, which reflects the infrared light to user's retina, and an infrared light detector, which detects the infrared light reflected by the user's retina. The eye tracking device may detect a user's gaze direction based on the detected infrared light by the infrared light detector.

Certain embodiments provide a head mounted display comprising a foveated display, wherein the resolution of the image produced at the centre of the display is higher than the resolution of the image at the periphery of the display, an optical system capable of projecting an image of said foveated display onto the retina of the eye, an adjustable imaging component within said optical system such that the centre of the display may be projected onto the centre of the retina for any given gaze direction of the eye, an eye tracking system capable of determining the gaze direction of the eye, in which the eye tracking system adjusts the optical system such that the centre of the foveated display remains imaged at the centre of the foveated display regardless of how the gaze direction changes.

The adjustable imaging component of the optical system may comprise a lens, which can be shifted laterally by electronic means. The optical system may further comprise a hot mirror that places an infrared sensitive camera in a conjugate plane to the foveated display. An infrared light source may illuminate the retina such that an image of the retina is formed on said infrared camera. The eye tracking system may include an image processing component that can determine how much the image of the retina on the camera has moved relative to its previous position, such that an image stabilisation algorithm can react to keep the image of the retina in a fixed position, shifting the lens as required to compensate for changes in gaze direction.

The head mounted display may comprise a rendering system capable of rendering a foveated image for display from a 3D scene, given a gaze direction within the scene. The rendering system may be configured to display a foveated image for the current gaze direction, so that the view presented to the user changes as their gaze direction changes.

Certain embodiments provide a binocular head mounted display system in which the head mounted display according to one or more embodiments is replicated for each eye of the user, to create a stereoscopic effect.

The system may be configured such that the gaze direction of each eye is determined, the angle subtended between the two eyes is used to determine a focal distance, the adjustable focussing component is set according to the focal distance so that the corneal focus of the eye is correct for current binocular gaze.

The system may further comprise a rendering system capable of rendering a foveated image within the 3D scene, based on the given a gaze direction and focus point. The rendering system may be configured to display a foveated image for the current gaze direction and focus of each eye so that a stereoscopic view is presented to the user that changes as their gaze direction or focus point changes.

The system may further comprise a means of determining movement of the head to which the display is mounted. The yaw, tilt and roll of the head may be determined by gyroscopic sensors.

The system may further comprise a rendering system capable of rendering a foveated image within the 3D scene, based on the given a gaze direction, head attitude and focus point. The rendering system may be configured to display a foveated image for the current head attitude, gaze direction, and focus of each eye so that a stereoscopic view is presented to the user that changes as their head attitude, gaze direction or focus point changes.

The system may further comprise a stereoscopic camera platform in which the head attitude can be used to control the attitude of the camera platform, the eye gaze direction and focus can be used to control the attitude and focus of individual cameras corresponding to each eye, the image from each camera is displayed on the foveated display corresponding to that eye such that the user may remotely control the camera platform using head attitude and gaze direction, and can remotely view the scene as if they were present.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A head mounted display for use in a virtual reality, mixed reality, or augmented reality system comprising:

a display device configured to display an image;

a tracking system, including an optical sensor, configured to determine a gaze direction of a user's eye;

an optical system configured to project the image into the user's eye, the optical system comprising an adjustable optical device; and processing circuitry configured to control the adjustable optical device based on the gaze direction of the user's eye such that a position of the image projected into the user's eye is unchanged, when the gaze direction of the user's eye changes, wherein the processing circuitry is further configured to control the adjustable optical device so that the adjustable optical device moves relative to the display device based on the determined gaze direction of the user's eye.

2. The head mounted display according to claim 1, wherein the display device is configured to display the image such that a first region of the image has a higher resolution than a second region of the image, the optical system is further configured to project the first region of the image on a central part of a retina of the user's eye, and the processing circuitry is further configured to control the adjustable optical device based on the gaze direction of the user's eye such that a position of the first region of the image projected on a retina of the user's eye is unchanged, when the gaze direction of the user's eye changes.

3. The head mounted display according to claim 2, wherein the display device comprises a first region configured to display the first region of the image and a second region configured to display the second region of the image, the first region of the display device corresponding to a central or foveal region of the display device and the second region corresponding to a peripheral region of the display device.

4. The head mounted display according to claim 2, wherein at least one of:

the first region of the display device comprises a higher density of pixels than the second region of the display device;

rendering circuitry is configured to render a first portion of the image using a first resolution and a second portion of the image using a second resolution, the second resolution being lower than the first resolution; or the display device comprises two display panels composited together using a reflective element.

5. The head mounted display according to claim 1, wherein the processing circuitry is further configured to determine a gaze location of the user's eye on the display device based on the gaze direction of the user's eye, and the head mounted display comprises rendering circuitry configured to render the image displayed on the display device based on the determined gaze location.

6. The head mounted display according to claim 1, wherein the optical sensor is configured to capture an image of a part of the user's eye, and the tracking system further comprises at least one of:

an emitter configured to illuminate the part of the user's eye; and one or more further optical devices arranged to direct the image of the part of the user's eye onto the optical sensor.

7. The head mounted display according to claim 6, wherein the adjustable optical device comprises a floating lens or a moveable lens, and the processing circuitry is further configured to determine an amount of movement to be applied to the adjustable optical device based on a position of the image of the part of the user's eye on the optical sensor.

8. The head mounted display according to claim 7, wherein the processing circuitry is further configured to determine a gaze location of the user's eye on the display device based on the amount of movement applied to the adjustable optical device.

9. The head mounted display according to claim 1, wherein the tracking system is further configured to determine a degree of focus of the user's eye, and the processing circuitry is further configured to control a focus of the image projected into the user's eye based on the determined degree of focus.

10. The head mounted display according to claim 1, wherein at least one of:

the tracking system is configured to determine a gaze direction of each of the user's eyes, the tracking system comprising a first portion that is configured to determine a first gaze direction of a first eye of the user and a second portion that is configured to determine a second gaze direction of a second eye of the user;

the display device comprises a first display panel configured to display a first image and a second display panel configured to display a second image, or a single display panel configured to display the image; or the optical system comprises a first portion configured to project the first image into the first eye of the user and a second portion configured to project the second image into the second eye of the user, or a first portion configured to project the image into the first eye of the user and a second portion configured to project the image into the second eye of the user.

11. The head mounted display according to claim 10, wherein the tracking system is further configured to determine an angle subtended between the first and second gaze directions of the first and second eyes of the user.

12. The head mounted display according to claim 11, wherein the tracking system is further configured to determine a degree of focus of each of the first and second eyes of the user based on the determined angle, and the processing circuitry is further configured to control a focus at least one of: the projected first image, the projected second image, and/or the projected image based on the determined degree of focus.

13. The head mounted display according to claim 12, wherein the processing circuitry is further configured to determine a first gaze location of the first eye of the user on the first display panel and a second gaze location of the second eye of the user on the second display panel, or a first gaze location of the first eye of the user and a second gaze location of the second eye of the user on the single display panel, and/or the head mounted display comprises rendering circuitry configured to render at least one of: the first image, the second image, and/or the image based on the first and second gaze locations and/or the determined degree of focus.

14. The head mounted display according to claim 13, wherein the head mount display comprises a sensor configured to detect at least one of: a movement of the user's head, a position of the user's head and a change of the position of the user's head, and the processing circuitry is further configured to determine the first gaze location of the first eye of the user on the first display panel and the second gaze location of the second eye of the user on the second display panel, or the first gaze location of the first eye of the user and the second gaze location of the second eye of the user on the single display panel based on at least one of the detected movement of the user's head, the detected position of the user's head, and the detected change of the position of the user's head.

15. The head mounted display according to claim 1, wherein the image comprises an image of a two-dimensional or a three-dimensional scene.

16. The head mounted display according to claim 1, wherein the processing circuitry is further configured to modulate a brightness of the display device.

17. A system, comprising:

the head mounted display according to claim 1;

at least one camera positioned remotely relative to the head mounted display; and a control system configured to control a position and/or movement of the at least one camera based on the gaze direction.

18. The system according to claim 17, wherein the tracking system is further configured to determine a degree of focus of each of a first eye and a second eye of the user, and the system comprises a first camera and a second camera, the first camera being associated with the first eye of the user and the second camera being associated with the second eye of the user, and the control system being is configured to control the position, movement and/or a focus of at least one or both of the first and second cameras based on the gaze direction and/or the determined degree of focus of at least one or both of the first and second eyes of the user.

19. The system according to claim 17, wherein the head mount display further comprises a sensor configured to detect at least one of: a movement of the user's head, a position of the user's head and a change of the position of the user's head, and the control system is further configured to control the position and/or movement of the at least one camera based on at least one of: the detected movement of the user's head, the detected position of the user's head, and the detected change of the position of the user's head.

20. The system according to claim 17, further comprising at least one of: a telepresence system, a virtual reality system, a mixed reality system, and/or an augmented reality system.

* * * * *